United States Patent Office 3,277,455
Patented Oct. 4, 1966

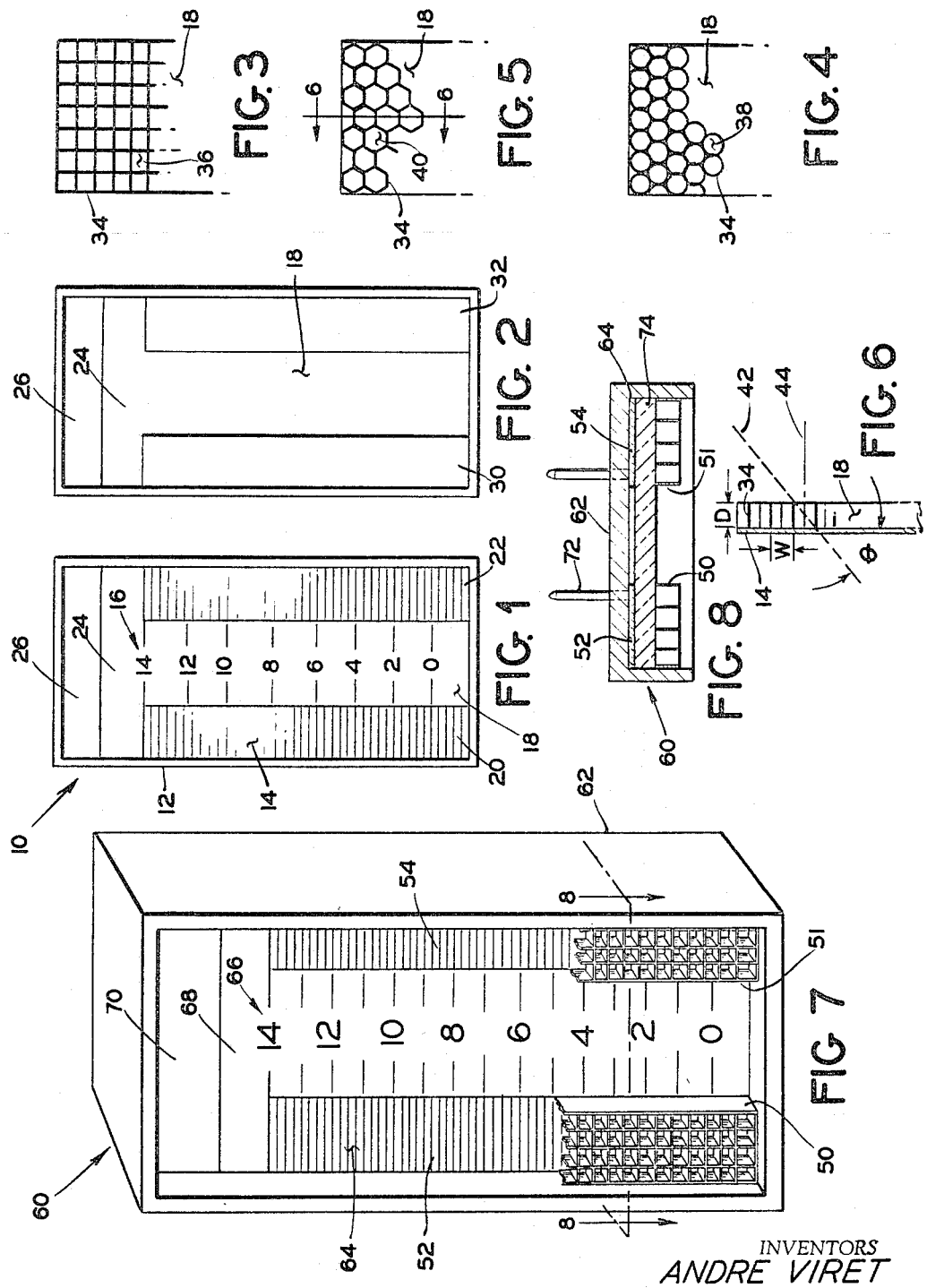

3,277,455
AMBIENT LIGHT CONTROL ON ELECTRO-LUMINESCENT SEGMENTS
Andre Viret, Ridgewood, and Leroy J. Ducharme, Caldwell, N.J., assignors to The Bendix Corporation, Teterboro, N.J., a corporation of Delaware
Filed Feb. 6, 1964, Ser. No. 343,080
5 Claims. (Cl. 340—382)

This invention relates generally to instrument display indicators, and particularly to means and methods for controlling the amount of ambient light impinging upon a segmented electroluminescent portion of a solid state instrument display indicator.

Heretofore, it has been the practice to utilize electroluminescent layers as the active display elements in solid state and other instrument indicating devices. This type of display depends on being able to distinguish whether the electroluminescent lamps are on or off under any condition of ambient illumination.

Generally, it should be noted that the display indicators or instruments would be assumed to be in an area where ambient lighting conditions range from zero to twenty foot-candles or even direct sunlight. At present, electroluminescent devices cannot be used under direct sunlight and other very high illuminating ambient conditions unless they are properly shaded.

Therefore, it is an object of this invention to provide a means of controlling the amount of ambient light impinging upon a segmented electroluminescent portion of a solid state display indicator.

Another object of this invention is to provide means for shading the segmented electroluminescent portion of a solid state display indicator while reducing the reading disability directly inherent to shading of the view of a viewer of an instrument display indicator.

Another object of this invention is to provide reliability in a display indicator by providing better reading conditions.

A further object of this invention is to provide an improvement in the reading of a solid state display indicator by providing readily attachable shading means in front of the active electroluminescent elements.

These and other objects and features of the invention are pointed out in the following description in terms of the embodiments thereof which are shown in the accompanying drawing. It is to be understood, however, that the drawing is for the purpose of illustration only and is not a definition of the limits of the invention, reference being had to the appended claims for this purpose.

In the drawings:

FIGURE 1 shows a display indicator with the electroluminescent segments presently being used as active display elements in solid state devices.

FIGURE 2 shows the area on which the invention is effective.

FIGURE 3 shows a species of the device in accordance with an embodiment of this invention.

FIGURE 4 shows another species of the invention.

FIGURE 5 shows still another species of the invention.

FIGURE 6 is a sectional view taken along line 6—6 of FIGURE 5.

FIGURE 7 shows the invention with the electroluminescent segments in accordance with another embodiment of this invention.

FIGURE 8 is a sectional view taken substantially along line 8—8 of FIGURE 7.

Electroluminescent lamps are luminous capacitors. The light emitting phosphor is embedded in a plastic-dielectric film that is positioned between a transparent electrode, such as tin oxide, and a metallic electrode. When an alternating electric field is applied to the electrodes, the phosphor emits light. Therefore, lighting an indicator with an electroluminescent lamp for nighttime operation has the following advantages. First, it provides for a uniform area source requiring a small amount of power to operate. Second, it is a "cold" light source and, therefore, does not contribute to the heat rise inside the indicator. Third, the electroluminescent lamp has the characteristic of a slow deteriorating rate and is free from catastrophic failures. Finally, the electroluminescent lamp does not change color when dimmed such as the incandescent white light which shifts color when the voltage is reduced. This technique is provided in a solid state indicator such as that described in a co-pending U.S. application Serial No. 254,373, filed January 28, 1963, by Frederick Blanke Sylvander, and assigned to The Bendix Corporation, assignee of the present invention, and in another co-pending U.S. application Serial No. 328,085, filed December 4, 1963, by the present inventors Leroy J. Ducharme and Andre P. Viret, and also assigned to The Bendix Corporation.

Referring to FIGURES 1 and 2, the electroluminescent lamp unit 10 comprises a casing 12 supporting an activating element such as an electroluminescent film or segment 14 and a scale 16 painted on a transparent means such as a glass substrate 18. The scale 16 is painted directly on the face of the glass substrate 18 and is interposed in the same plane between two series 20 and 22 of electroluminescent segments 14.

Electroluminescent lamps have been fabricated with forty-four electroluminescent segments per inch on a glass substrate that appears to be a continuous column from a normal viewing distance. The display, utilizing the forty-four lines per inch, electroluminescent segment column is shown in FIGURE 1 with adjoining area source lamps contained on the same glass substrate 18 for lighting the scale 16, a legend area 24 and an annunciator display area 26.

The series of electroluminescent segments 20 and 22 may be sequentially lighted to effect an indicator function such as for an aircraft or space vehicle equipment, as brought out in the copending U.S. application Serial No. 254,373. However, as brought out before, the present device cannot be used under direct sunlight or other very high illuminating ambient conditions unless the areas 30 and 32 (see FIGURE 2) containing the electroluminescent segments, are properly shaded against the sunlight.

Therefore, referring to FIGURES 3 to 6, in addition to FIGURES 1 and 2, of the present invention, the glass substrate 18 provided in the electroluminescent lamp unit 10 is photosensitive and treated in a manner to produce fine black mesh walls or microscreen 34, as shown in FIGURES 3, 4, and 5 adjacent the active elements or electroluminescent segments 20 and 22 of the electroluminescent lamp 10.

Photosensitive glass is glass which, when subjected to photographic processes, reproduces permanently in the glass a photographic image. The photographic process consists of two steps: (1) exposure to ultraviolet light through a negative, and (2) development of the image by heat treatment. This process reproduces the image within the structure of the glass, not on the surface as with conventional methods of photographic printing. Complete penetration through the glass allows a three dimensional image. That is, as shown in FIGURE 6, the microscreen 34 may be of the same thickness as the glass substrate 18 and the holes formed by the walls or microscreen 34 may be any shape desirable such as square holes 36, as shown in FIGURE 3, round holes 38, as shown in FIGURE 4, and hexagonal holes 40, as shown in FIGURE 5. Optimum transmission or viewing ability is achieved by making the ratio of the hole 36, 38, or 40 area to the solid wall 34 area as large as possible.

It should be noted, as shown in FIGURE 6, that the size and shape or pattern width W of the holes 36, 38, and 40 in the microscreen 34 and the depth D of the walls 34 will determine the angle of shading θ, that is, the maximum angle that a light ray 42 makes with a line 44 perpendicular to the plane of the electroluminescent lamp 14 and still not impinge directly on the electroluminescent lamp 14.

It should be also noted that the microscreen 34 limits the angle of visibility. If the viewing angle is varied from zero degrees to the perpendicular to the angle of shading, the apparent brightness of the lamp will vary from a maximum, actual brightness transmission factor of the microscreen, to zero. The visibility of the electroluminescent lamp may be somewhat improved by presenting the display instrument to the view of the pilot, utilizing this instrument on his aircraft, as close to a line perpendicular to the plane of the electroluminescent lamp. That is, the viewer of the display instrument should view the electroluminescent lamp 14 in line parallel to the plane of the microscreen walls 34, the viewing angle being the supplement of the shading angle.

The microscreen 34 is used only in conjunction with the solid state electroluminescent lamp segments 14 of the display. Therefore, this permits the inactive portions of the display such as the scale 16, the legend area 24 and the annunciator display area 26 to be produced by conventional techniques. That is, white translucent paint in a black background, transilluminated at night and ambient illuminated in the daytime.

The thickness of the microscreen should be kept minimal to reduce parallax when the active elements are read against the inactive portions of the display panels as is the case of a bar graph.

It should be noted that in the embodiment of the invention shown in FIGURES 7 and 8, the same shading techniques can be used with fine mesh walls or microscreens 50 and 51 made of metal or other materials placed directly in front of an activating element such as an electroluminescent film or segments 52 and 54 of an electroluminescent lamp display unit 60 for the presentation of the thickness of the microscreen, but otherwise would be virtually identical to the microscreen 34 formed within the glass substrate 18 described before.

Referring to FIGURES 7 and 8 more specifically, the display indicator 60 is shown comprising a casing 62 supporting an electroluminescent film 64 having the two series of electroluminescent segments 52 and 54 which can be sequentially lighted to effect the indicator function as brought out in the co-pending U.S. application Serial No. 254,373.

In addition, the lamp is provided with area source illumination contained on the same glass substrate 74, adjoining the series of electroluminescent segments 52 and 54 for lighting a scale 66, a legend 68, and an annunciator display 70 as in the electroluminescent lamp unit 10 described in the first embodiment.

Furthermore, the lamp unit 60 is provided with electrical contacts or connecting pins 72 which mate with jacks of the overall electronics system of an aircraft or space vehicle (not shown), for obtaining electrical connection between the instrument display indicator and the electronics system to activate the electroluminescent segments 52 and 54 depending on the instruments' specific parameter or modules. The casing 62 encircles and contains the electroluminescent segments 52 and 54 secured on the glass substrate 74 in front of which is located the microscreens 50 and 51 as best shown in FIGURE 8.

It should be noted that the thickness of the electroluminescent lamp glass substrates 18 and 74 may be normally in the range of .085 inch, but utilizing a microsheet glass, a construction of thickness of .020 inch can be obtained. Layers of the electroluminescent segments 20 and 22, and 52 and 54 are secured to the glass substrates 18 and 74 respectively with the microscreen 34 embedded in the glass substrate 18 or the microscreen 50 and 51 attached to the front face of the glass substrate 74. The whole electroluminescent lamp assembly described is then secured within its casing 12 or 62.

More specifically, it should be noted that this invention provides for assembled electroluminescent lamp units 10 and 60 utilizing solid state techniques which provide an instrument display indicator with no moving parts from the sensor of the aircraft or space vehicle (not shown) to the display instrument. In addition, these instruments, as this invention discloses, provided means for controlling the amount of ambient light impinging upon its activating elements or electroluminescent segments so that they can be read even at very high ambient illumination.

While two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a display indicator of an aircraft, the combination comprising a series of aligned electroluminescent segments defining a dimensional surface, means of supporting said electroluminescent segments in a column, dial means extending in the adjacent plane along said electroluminescent segments to provide a scale reading of energized ones of said electroluminescent segments, and a microscreen in front of said electroluminescent segments having walls extending substantially perpendicular to said electroluminescent segments for shading said electroluminescent segments from ambient lighting for better reading.

2. The structure defined by claim 1 wherein said microscreen in front of said electroluminescent segments is of a square configuration.

3. The structure defined by claim 1 wherein said microscreen in front of said electroluminescent segments is of a round configuration.

4. The structure defined by claim 1 wherein said microscreen in front of said electroluminescent segments is of a hexagonal configuration.

5. An instrument display indicator comprising a casing, a glass substrate supported within said casing, a linear scale supported for illumination by said substrate, a series of electroluminescent segments extending in a column parallel to said scale, and a microscreen adjacent and overlying said electroluminescent segments for shading said electroluminescent segments from ambient light whereby said electroluminescent segments can be read relative to said scale independent of the intensity of the ambient illumination.

(References on following page)

References Cited by the Examiner

UNITED STATES PATENTS

| | | | |
|---|---|---|---|
| 2,526,495 | 10/1950 | Meyer | 340—332 |
| 2,616,957 | 11/1952 | Thiem | 340—382 |
| 2,653,516 | 9/1953 | Johnson. | |
| 2,682,134 | 6/1954 | Stookey | 88—1 |
| 2,749,794 | 6/1956 | O'Leary | 88—1 |
| 2,942,254 | 6/1960 | Beers. | |
| 3,110,882 | 11/1963 | Stuerzl | 340—378 |
| 3,133,221 | 5/1964 | Knochel et al. | 315—169 |
| 3,221,170 | 11/1965 | Sylvander | 340—366 X |

References Cited by the Applicant

UNITED STATES PATENTS

| | | |
|---|---|---|
| 2,821,646 | 1/1958 | Walker. |
| 3,008,065 | 11/1961 | Chamberlin. |
| 3,043,979 | 7/1962 | Geel et al. |
| 3,096,458 | 7/1963 | Demmy. |

NEIL C. READ, *Primary Examiner.*

I. J. LEVIN, *Assistant Examiner.*